United States Patent [19]

Cummings et al.

[11] Patent Number: 4,717,559

[45] Date of Patent: Jan. 5, 1988

[54] KAOLIN CALCINER WASTE HEAT AND FEED RECOVERY SYSTEM AND METHOD

[75] Inventors: Carl S. Cummings, Warthen; J. Richard Hudson, McIntyre, both of Ga.

[73] Assignee: E.C.C. America Inc., Atlanta, Ga.

[21] Appl. No.: 870,222

[22] Filed: Jun. 3, 1986

[51] Int. Cl.$^4$ .............................................. C01B 33/28
[52] U.S. Cl. .................................... 423/328; 501/150; 106/288 B
[58] Field of Search ..................... 501/150; 106/288 B; 423/111, 328

[56] References Cited

U.S. PATENT DOCUMENTS

| | | | |
|---|---|---|---|
| 3,309,214 | 3/1967 | Podschus et al. | 501/150 |
| 3,586,523 | 6/1971 | Fanselow et al. | 501/150 |
| 3,941,872 | 3/1976 | Puskar | 423/331 |
| 4,246,039 | 1/1981 | Mixon, Jr. | 501/150 |
| 4,381,948 | 5/1983 | McConnell et al. | 501/145 |

OTHER PUBLICATIONS

*Perry's Chemical Engineer's Handbook*, pp. 20–54, McGraw Hill, N.Y., 1984.

*Pulp & Paper*, by Paul A. Humbert, 2-1980.

*Primary Examiner*—Patrick P. Garvin
*Assistant Examiner*—Paige C. Harvey
*Attorney, Agent, or Firm*—Stefan J. Klauber

[57] ABSTRACT

An improvement is disclosed applicable to the production of calcined, anhydrous kaolins in particulate form. A process and system are disclosed in which the calciner is integrated with a preceding spray drier by cycling the dust-laden calciner hot off-gases to the spray drier to achieve savings in energy. Waste heat from the calciner, and concomitantly dust-like clay particles carried in the off-gas, are thereby passed to the drier and their values recovered.

7 Claims, 2 Drawing Figures

KAOLIN CALCINER WASTE HEAT AND FEED RECOVERY SYSTEM AND METHOD

FIELD OF THE INVENTION

This invention relates generally to the production of calcined, anhydrous kaolins in particulate form, suitable e.g. for use as filler or coating pigments in the manufacture of paper and paperboard products or as pigments for fillers in paints, rubbers and plastics. More specifically, the invention relates to a process and system in which the kiln is integrated with a preceding spray drier by cycling the dust-laden kiln hot off-gases to the spray drier to achieve savings in energy. Waste heat from the kiln, and concomitantly dust-like clay particles carried in the off-gas, are thereby passed to the drier and their values recovered.

BACKGROUND OF THE INVENTION

Calcined kaolin pigments have found increasing acceptance in paper manufacture, where they are particularly useful as fillers in or for coating of paper and paperboard products. Such pigments are also widely used as fillers in paints, rubbers and plastics. In the usual process for preparing such a pigment, a selected kaolin crude, after mining, is generally worked up by washing, classifying, and if desired, by other types of beneficiation. After such treatment the kaolin results as an aqueous slurry. The slurry is then dried, typically by spray drying, may then be pulverized, and is calcined. The present invention relates particularly to the spray drying/calcining steps and to the integration of these steps.

The general techniques thus utilized in preparing calcined kaolins are discussed in a number of prior art patents. For example, Fanselow et al, U.S. Pat. No. 3,586,523 describes the production of a calcined kaolin filler pigment, in which the starting material, a fine particle-sized kaolin crude is crushed, dispersed in water, degritted, classified to remove nearly all particles larger than about 2 microns ESD (equivalent spherical diameter), and chemically bleached with or without flotation beneficiation. Specifically, the filter cake from bleaching containing about 60% solids, is fluidized by adding a small amount of ammonium hydroxide. The dispersed slip is spray dried, pulverized, calcined and again pulverized. This patent therefore describes some basic operations in the production of calcined kaolin pigments, but nothing is said about using the calciner hot off-gases for any purpose.

This is also true of McConnell et al, U.S. Pat. No. 4,381,948, which describes the preparation of a kaolin clay pigment consisting of high light scattering porous aggregates of kaolin clay platelets, having certain properties of specific gravity, porosity and size distribution. The method of preparation typically comprises forming an aqueous dispersion of the crude clay at e.g. 60% solids, diluting with water to 15% solids, degritting, and subjecting to a particle size separation by centrifuging. From such separation a kaolin slurry of clay is recovered in which substantially all particles are less than 1 micron ESD. The slurry is dried by spray drying, pulverized, calcined under controlled temperature conditions, and again pulverized.

In Podschus et al, U.S. Pat. No. 3,309,214, a process is disclosed for the preparation of calcined kaolin pigments from kaolin clays. The crude kaolin is worked up by washing, classifying, etc., and after such treatment results as an aqueous slurry of about 50% by weight solids. It is then subjected to two calcining treatments, the first of which is known as "shock calcination", and the second of which is of the conventional type. Shock calcination is effected in a highly turbulent hot gas stream introduced into a conical reaction chamber at high velocity, in which the kaolin is heated to a temperature between 600° to 1000° C. for a period of not more than one second. The second calcination is effected at a temperature between about 800° to 1100° C. for a time of at least 10 minutes, e.g. one hour, in a conventional furnace such as a muffle furnace. Prior to said first calcination, the kaolin may be dried, preferably by the hot gases of the shock calcination furnace, at temperatures below about 400° C. to about 500° C. as it is desirable to prevent the kaolin from being dehydrated, since the shock calcination of kaolin which is already partially dehydrated is less effective. That is, the heating of the wet kaolin may be effected in two stages instead of in a single stage, but in both instances by the same source of heat. It may be noted that there is no cooperation between the second calciner and a spray drier (none is used), and no fuel savings are realized from the off-gas of the second calciner.

An article by Paul A. Hubert in *Pulp and Paper*, February, 1980, describes the use of a flash drier with a lime kiln. In the flash-drier arrangement, washed lime mud containing 30% to 40% moisture is conveyed from the recovery system centrifuge or vacuum filter (normally the final stage before drying and calcining in the kiln) to a mixer, where it is combined with a portion of dried material from the system cyclone. By properly blending dry and wet materials, the feed is conditioned for more efficient drying while eliminating the handling problems associated with wet calcium carbonate sludge. The conditioned feed is then discharged into the flash drier-cage mill where it contacts the hot gas stream from the cold end of the kiln. These gases are now at 1000° F. to 1200° F., hotter than normal. Because dry material is being fed to the kiln, the drying operation has been moved from the kiln to the flash drier. The cage mill disintegrates lumps of calcium carbonate, mixing the hot gas stream with the fine particles. The hot gas stream conveys the material through the uptake duct to the cyclone, simultaneously drying it to 1% moisture. The dry material is separated from the air stream in the cyclone and discharged into a dry divider where a portion is returned to the mixer for conditioning the feed. The remainder is fed to the kiln for calcination. Since it is necessary to split the dried material and return one portion to the mixer where it contacts wet feed so as to condition the wet feed for more efficient drying, it follows that there is recycling of some dried material through the flash drier. Fuel savings are said to be just under 10% to over 30%. On the other hand, in the subject process, the process steps are not comparable and fuel savings can be in a higher range, viz., 40–50%. Furthermore, the calcium carbonate feed is not a kaolin, and does not have the properties of a kaolin.

Mixon, Jr., U.S. Pat. No. 4,246,039 discloses the wet processing of kaolin in which an electrically augmented vacuum filter, designated "EAVF", is used to partially dewater an aqueous slurry. In the process, a kaolin slurry containing less than 45% solids is preheated by direct heat exchange with hot stack exhaust from a clay calciner in a wet scrubber. The exhaust gas is typically in the range of 800° to 1000° F. and the slurry is heated from ambient temperature to a temperature above 100° F., e.g. in the range of 125° to 140° F., with some water being evaporated to increase solids by 2 to 5 weight percent. The use of preheated feed to the electrofilter is said to reduce the energy demands of the electrofilter and as preconcentrated slurry is discharged from that apparatus and fed to the spray drier at elevated temperature, to reduce energy requirements to operate the spray drier. The exhaust gas from the kiln contains small amounts of particulates, including fine calcined clay particles which are introduced into the clay slurry in the wet scrubber. However, the EAVF filter is a complex means of removing water. Its operation involves electrolytic dissociation of the water. Hydrogen gas, sodium ions and hydroxide ions form at the cathodes. Oxygen and hydrogen ions accumulate at the anodes. Clay collects on the anode surfaces. The apparatus includes an overhead traveling carriage equipped with hoists to raise an anode vertically out of the slurry and return it vertically to the slurry. Doctor blades associated with the traveling carriage are constructed to scrape the clay filter cake from the surfaces of the anodes before they are resubmerged in the clay suspension. Over long-term use it would be subject to breakdown/repair.

Conventionally, however, the exhaust gas from the calciner is fed to a wet scrubber which takes out the dust particles and the gas is vented. Wet scrubbing is resorted to in order to meet governmental dust attainment requirements for the vented air. However, the dust so removed is in the form of a very dilute aqueous suspension, and although the suspension could theoretically be filtered and the product dried, such process is uneconomical. Accordingly, the suspension is discharged to waste, thereby adding to the cost of waste disposal.

In principle, it might be thought that one could directly collect the dust in the calciner exhaust gas by means of a conventional bag dust collecting system, but the fabrics used in such collectors cannot withstand the high temperatures which would be encountered at the exhaust from the calciner, typically about 1000° F.

Accordingly, the present invention is directed to a practical method and system, which functions to reduce the energy requirements associated with the wet processing of kaolin to dry, calcined particles, and which further, provides for recovering the fines in the calciner exhaust gas.

SUMMARY OF THE INVENTION

According to the present invention, one or more kilns are integrated with a spray drier and an air heater—which is a combustor in which fuel is burned to heat air for supply to the drier. The kiln exhaust gas (with the entrained calciner dust) is passed to the spray drier to supplement the hot air from the air heater, preferably joining the heated air in a conduit connecting the heater to the drier. The amount of heated air can therefore be reduced and thus the amount of fuel burned in the heater.

The flow pattern through the spray drier is arranged to permit the particulate material in the hot stack gases to flow through the upper regions of the spray drier into dust collectors associated with the drier and communicating therewith.

By this simplified means, savings in energy can be achieved, as well as recovery of calciner dust particles entrained with the kiln gas.

Thus, the invention comprises diverting said calciner exhaust gas to the spray drier, thereby utilizing the heat of the gas to dry the incoming kaolin feed for the calciner and simultaneously cooling the said exhaust gas. The said cooled gas is subsequently passed through a bag filter dust collector, thereby recovering the calciner dust, which may then be reunited with the main dry kaolin feed to the calciner.

The typically 1000° F., flue gas is well suited to be introduced into the spray drier, because this is typical of the gas temperatures desired there. Thermodynamically it is efficient to employ a high temperature level waste heat stream for a heat duty where high level heat is required, as contrasted with using it for a job where a low level waste heat stream, which might be available, would be adequate.

It may be noted that the wet scrubber, which is used even in U.S. Pat. No. 4,246,039, is eliminated in the present invention because the kiln exhaust fines are not washed out with water. Thus at least one piece of equipment is eliminated.

BRIEF DESCRIPTION OF THE DRAWINGS

The invention is diagramatically illustrated, by way of example, in the drawings appended hereto, in which.

DESCRIPTION OF PREFERRED EMBODIMENTS

Figure 1:
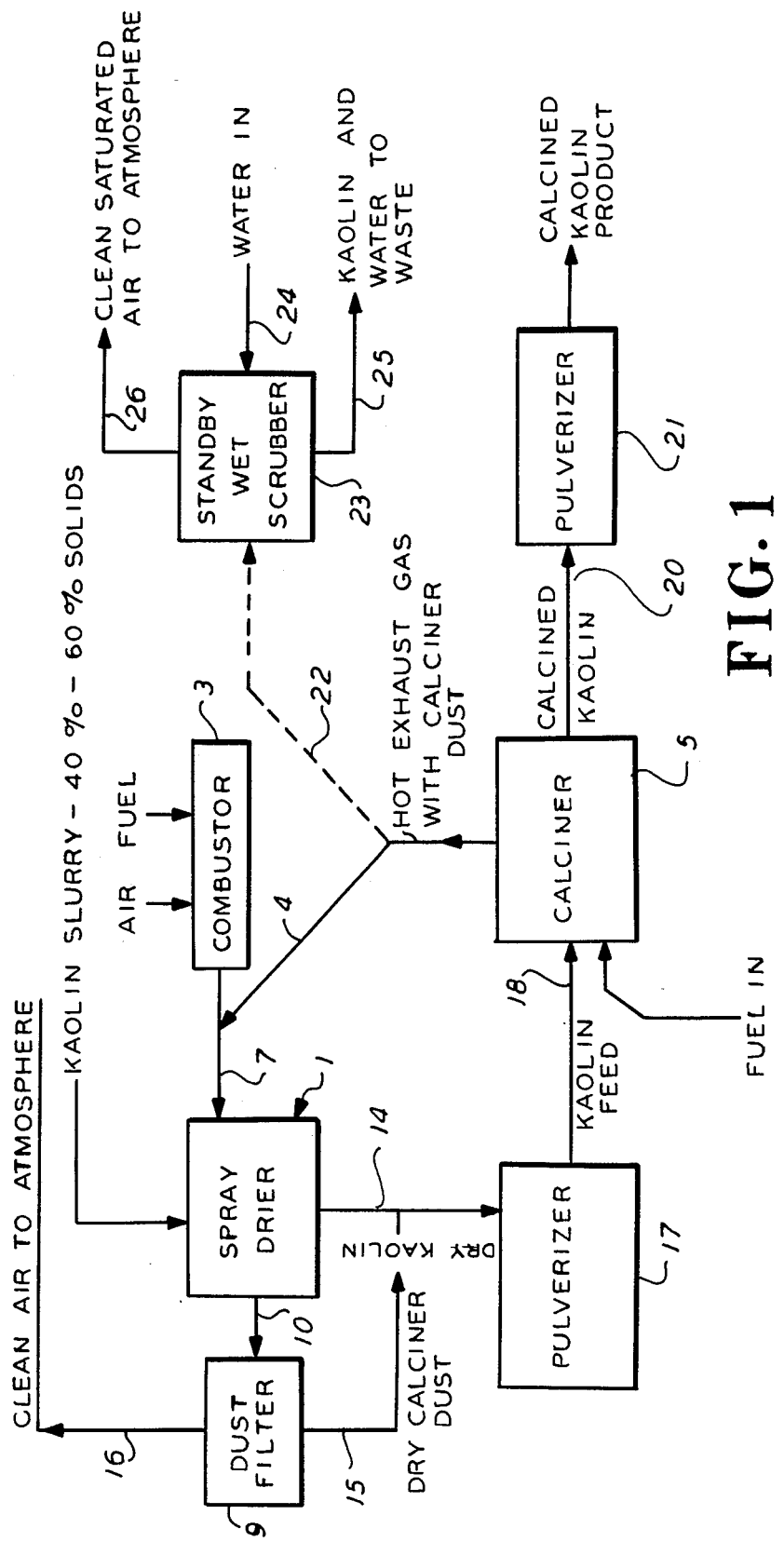
FIG. 1 is a schematic block diagram showing a typical plant layout, forming a system in accordance with the present invention.
Figure 2:
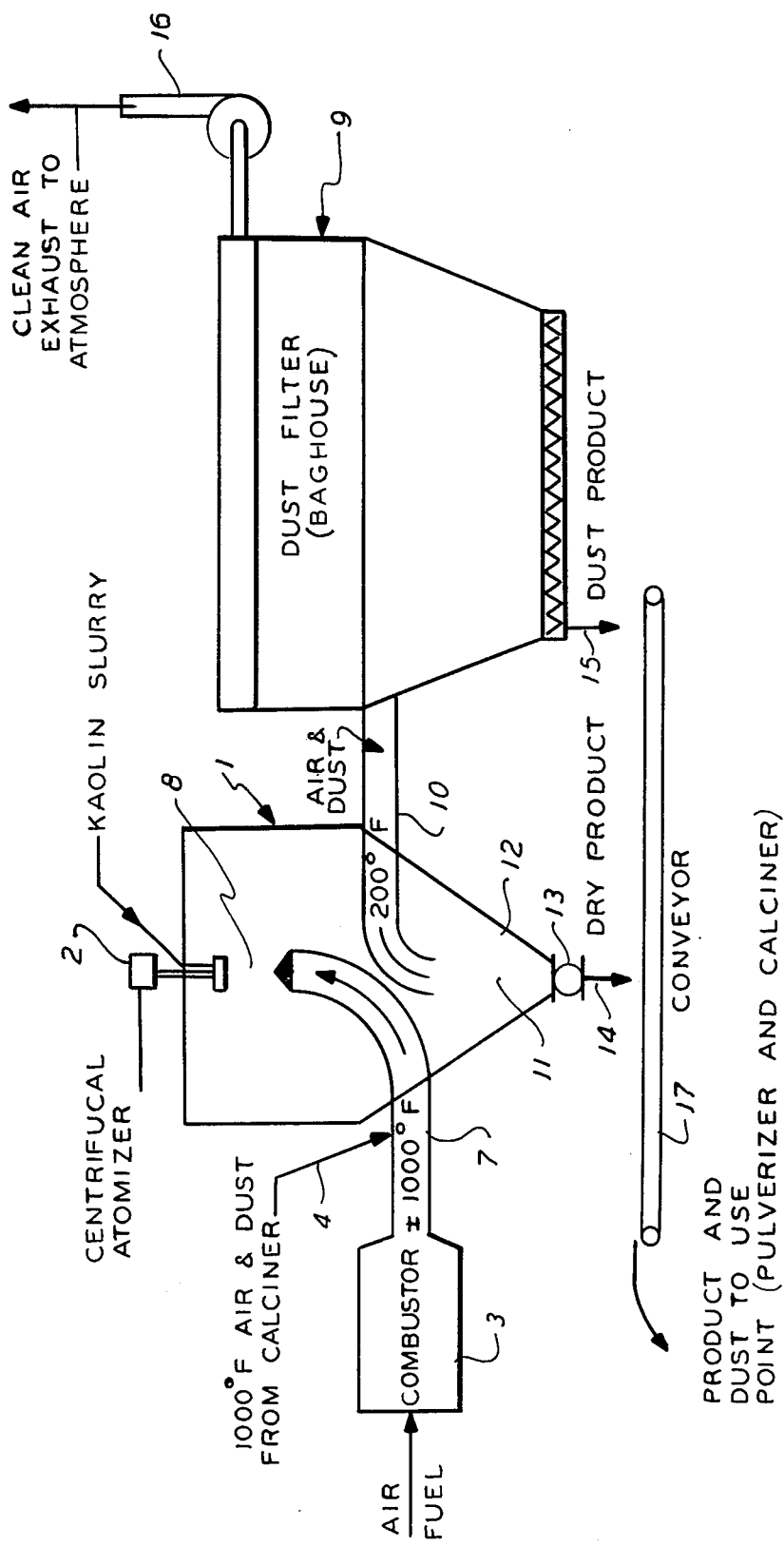
FIG. 2 is a schematic diagram of a portion of the FIG. 1 system, and illustrating the manner in which the spray drier, combustor and dust filter are arranged, including with respect to the flow of exhaust gas from a calciner carrying fine particulate clay material.

As shown in FIGS. 1 and 2, a spray drier 1, of generally conventional construction, receives an aqueous kaolin clay slurry, which is introduced through centrifugal atomizer 2 (FIG. 2) and atomized. The slurry can include from about 35% to 65% solids, although 40% to 60% solids is preferred. Air and fuel are supplied to a combustor 3 and the fuel is burned to give a stream at an elevated temperature suitable for drying the slurry, for example at 1000° F. Exhaust gas from calciner 5, at a temperature in the range of about 800° to 1000° F., preferably about 1000° F., comprising air and calciner dust, i.e. clay fines, is introduced into spray drier 1, preferably by joining it with the hot air stream from combustor 3, hence by connecting the line 4 from the calciner, to the line or conduit 7 connecting combustor 3 to the spray drier. Although the calciner dust includes some dehydroxylated kaolin, the bulk of such dust is found to be substantially uncalcined kaolin, whereby such dust is desirable for recovery for use as a feed for the kiln.

The conduit 7 (FIG. 2) opens into the central, upper portion 8 of drier 1 adjacent the atomizer 2, whereby the hot air stream contacts the incoming kaolin slurry to dry it. A dust filter 9, comprising one or more bags, is located adjacent spray drier 1, and is connected thereto by a duct 10, the input of which opens into a lower portion 11 of drier 1. Dried clay particles fall by gravity through the lower, generally cone-shaped portion 12 of drier 1, and exit via bottom outlet 13 and line 14; simultaneously, air reduced in temperature, for example at 200° F., by the drying process, and carrying kaolin fines (including from the calciner dust), passes into the dust bag of dust filter 9 via line 10. The temperature of this air is within the temperature tolerance of the dust bag. The air stream in line 10, on passing into the larger diameter dust bag, deposits the fines at the bottom, which exit through line 15, and clean air is exhausted to the atmosphere via conduit 16. A conveyor 17 carries away the dried clay product exiting the drier via outlet 13 (and line 14), and the dust product exiting the dust bag via line 15.

In the schematic plant layout of FIG. 1, dry kaolin from drier 1 in line 14, is joined by dry calciner dust from the bag collector in line 15, and is passed to pulverizer 17. The pulverized output is passed by line 18 to the conventional calciner 5, which can be a Hereschoff or other type furnace, where it is calcined. The calcined kaolin is then passed via line 20 to pulverizer 21, and calcined kaolin product is removed therefrom.

Broken line 22 (FIG. 1) indicates the previously used path of the calciner hot stack gas containing calciner dust. In the prior practice it was passed to a wet scrubber 23 (here only suggested as a standby if such unit happens to be available) into which water is introduced by line 24; kaolin and water are passed to waste by line 25, and clean saturated air goes to the atmosphere by line 26.

EXAMPLE

This Example illustrates the relatively enormous savings in heat energy, and in recovered kaolin, that can be achieved by practice of the invention. In particular, a system generally in accord with that shown in FIGS. 1 and 2 was utilized, except that in order to initially establish control conditions, no heat recovery from the calciner was utilized. The conditions present were such that the inlet temperature to the drier, i.e. in duct 7, was 1100° F., and the outlet temperature in duct 10 was at 200° F. The evaporation rate at the drier was 26,800 pounds per hour. In order to achieve this evaporation rate under the control conditions, it was found that 427.4 thermal units per hour were required, i.e. a commensurate fuel input was needed.

In order to demonstrate the effectiveness of the invention, the operating conditions specified for the control remained unchanged, including the mentioned evaporation rate, except that the arrangement was such that the exhaust gases from the calciner were recirculated as illustrated in FIG. 1 to the spray drier, i.e. in accordance with the invention. Stabilization was achieved in a matter of minutes, and measurements were thereupon undertaken. It was found that the fuel input in order to maintain the same evaporation rate had decreased to correspond to a need of but 376.8 thermal units per hour, thereby providing a net saving of 50.6 thermal units per hour. It will be evident that this large reduction in required thermal units, when multiplied over the number of hours for operation of a single calciner for a year, translates into a relatively enormous fuel saving.

It will also be appreciated that the fuel savings evidenced in the present Example are based upon use of a single calciner of a given capacity. Depending upon such factors as the number of calciners in the system and the capacities of each, fuel savings considerably greater than in this Example can be achieved, e.g. at least as high as 40 to 50%.

Further, however, it was found that in the control system as aforementioned, and utilizing a scrubber operation, the calciner dust being lost to the scrubber was approximately 800 pounds per hour. Utilizing the arrangement of the invention as shown in FIGS. 1 and 2, this 800 pounds per hour of dust was entirely reclaimed, and no scrubber operation was necessary at all. Again, it will be appreciated that the rate of recovery (here involving but a single calciner) is so high as to produce enormous quantities of recovery of feed in the course e.g. of a yearly operation of such a calcining system.

It will be further appreciated that while the systems depicted in FIGS. 1 and 2 are based upon use of but a single calciner, a plurality of calciners may be readily utilized in the invention, with each kiln being connected by suitable ducts to a single spray drier, and controls provided as are well known in the art, for separately controlling the operations of the individual kilns and the interconnection to the remaining portions of the system.

While the present invention has been set forth in terms of specific embodiments thereof, it will be understood in view of this disclosure, that numerous variations upon same are now enabled to those skilled in the art, which variations yet reside within the scope of the present teaching. Thus, for example, while the present invention has been particularly described in connection with its use in kaolin processing, it may also be usefully employed in the processing of other particulate minerals wherein similar calcining and drying arrangements are provided. Accordingly, the invention is to be broadly construed, and limited only by the scope and spirit of the claims now appended hereto.

What is claimed is:

1. In the method for producing a calcined kaolin pigment product, by feeding an aqueous slurry of kaolin to a spray drier which is provided with heated gases from a combustor, feeding the dried kaolin product from said spray drier to a calciner; and recovering the calcined product; the improvement enabling recovery of heat energy and calciner dust from said calciner, comprising:
   cycling the hot exhaust gases and entrained calciner dust from said calciner back to said spray drier by joining the said exhaust gases and calciner dust with the said heated combustor gases being provided to said calciner; and collecting said calciner dust from said drier and providing same together with the said dried kaolin product as feed to said calciner.

2. A method in accordance with claim 1, wherein the calciner dust from said drier is collected in a dust bag connected to receive flow from the interior of said spray drier.

3. In the method for producing a calcined particulate mineral product, by feeding an aqueous slurry of said mineral to a spray drier which is provided with heated gases from a combustor, feeding the dried mineral product from said spray drier to a calciner; and recovering the calcined product; the improvement enabling recovery of heat energy and calciner dust from said calciner, comprising:
   cycling the hot exhaust gases and entrained calciner dust from said calciner back to said spray drier by joining the said exhaust gases and calciner dust with the said heated combustion gases being provided to said calciner; and collecting said calciner dust from said drier and providing same together with the said dried product as feed to said calciner.

4. A method in accordance with claim 3, wherein the calciner dust from said drier is collected in a dust bag connected to receive flow from the interior of said spray drier.

5. A process in accordance with claim 2 wherein the aqueous slurry has a solids content in the range of 40–60 weight percent.

6. The process as set forth in claim 5 in which the dried kaolin particles and a calciner dust are mixed, the mixture passed to a calciner and the product of calcination is recovered.

7. The process as set forth in claim 5 in which the mixture of dried kaolin particles and kaolin dust is pulverized then calcined, and the product of calcination is pulverized and recovered.

* * * * *

UNITED STATES PATENT AND TRADEMARK OFFICE
CERTIFICATE OF CORRECTION

PATENT NO. : 4,717,559

DATED : January 5, 1988

INVENTOR(S) : Carl S. Cummings and J. Richard Hudson

It is certified that error appears in the above-identified patent and that said Letters Patent is hereby corrected as shown below:

In column 6, line 44, change "calciner" (first occurrence) to read -- spray drier--

In column 6, line 64, change "calciner" (first occurrence) to read -- spray drier --

Signed and Sealed this

Ninth Day of August, 1988

Attest:

DONALD J. QUIGG

Attesting Officer

Commissioner of Patents and Trademarks